United States Patent
Kiyohiro

(10) Patent No.: US 10,938,046 B2
(45) Date of Patent: Mar. 2, 2021

(54) FUEL CELL SYSTEM

(75) Inventor: Yukihiko Kiyohiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 14/115,681

(22) PCT Filed: Apr. 17, 2012

(86) PCT No.: PCT/JP2012/060804
§ 371 (c)(1),
(2), (4) Date: Nov. 5, 2013

(87) PCT Pub. No.: WO2012/157401
PCT Pub. Date: Nov. 22, 2012

(65) Prior Publication Data
US 2014/0087279 A1     Mar. 27, 2014

(30) Foreign Application Priority Data

May 19, 2011     (JP) .............................. JP2011-112374

(51) Int. Cl.
*H01M 8/0612*     (2016.01)
*H01M 8/04089*     (2016.01)
(Continued)

(52) U.S. Cl.
CPC ..... *H01M 8/0618* (2013.01); *H01M 8/04097* (2013.01); *H01M 8/04268* (2013.01);
(Continued)

(58) Field of Classification Search
CPC ....... H01M 8/0618; H01M 2008/1293; H01M 8/04097; H01M 8/04268; H01M 8/04753;
(Continued)

(56) References Cited

U.S. PATENT DOCUMENTS

| | | | | |
|---|---|---|---|---|
| 5,510,056 A | * | 4/1996 | Jacobs | B01J 35/04 252/373 |
| 5,942,349 A | * | 8/1999 | Badwal | H01M 8/0208 427/115 |

(Continued)

FOREIGN PATENT DOCUMENTS

| | | |
|---|---|---|
| JP | 2001-206701 | 7/2001 |
| JP | 2002-246047 | 8/2002 |

(Continued)

OTHER PUBLICATIONS

Lee, S.H.D., et al. "Hydrogen from natural gas: part I—autothermal reforming in an integrated fuel processor", International Journal of Hydrogen Energy, vol. 30, pp. 829-842, published Oct. 22, 2004. (Year: 2004).*

(Continued)

*Primary Examiner* — Stewart A Fraser
*Assistant Examiner* — Lilia Nedialkova
(74) *Attorney, Agent, or Firm* — Rankin, Hill & Clark LLP

(57) ABSTRACT

A fuel cell system includes a fuel cell stack, an oxygen-containing gas flow rate control device, a reformer, a raw fuel flow rate control device, and an exhaust gas flow rate control device. In the fuel cell system, the oxygen-containing gas flow rate control device includes a start-up oxygen-containing gas flow rate regulator valve for supplying an oxygen-containing gas to the reformer to perform partial oxidation reforming from start-up of fuel cells until the temperature of the fuel cell stack is raised to a predetermined temperature. After the temperature of the fuel cell stack reaches the predetermined temperature, the exhaust gas flow rate control device supplies an exhaust gas to the reformer to perform the partial oxidation reforming and steam reforming.

3 Claims, 7 Drawing Sheets

(51) Int. Cl.
*H01M 8/04223* (2016.01)
*H01M 8/04746* (2016.01)

(52) U.S. Cl.
CPC ... *H01M 8/04753* (2013.01); *H01M 8/04761* (2013.01); *H01M 8/04776* (2013.01)

(58) Field of Classification Search
CPC .......... H01M 8/04761; H01M 8/04776; Y02E 60/50
See application file for complete search history.

(56) References Cited

U.S. PATENT DOCUMENTS

| | | | |
|---|---|---|---|
| 8,574,422 | B2 | 11/2013 | Beech et al. |
| 2002/0114988 | A1 | 8/2002 | Iwasaki et al. |
| 2004/0131912 | A1* | 7/2004 | Keefer .............. H01M 8/04007 429/411 |
| 2005/0074642 | A1* | 4/2005 | Foger ....................... C01B 3/382 429/425 |
| 2008/0090114 | A1* | 4/2008 | Schaevitz ........... H01M 8/0618 429/412 |
| 2009/0253003 | A1* | 10/2009 | Matsumoto ....... H01M 8/04007 429/412 |
| 2010/0203404 | A1* | 8/2010 | Miyazaki .......... H01M 8/04014 429/423 |
| 2011/0065016 | A1* | 3/2011 | Sata .................... H01M 8/0223 429/469 |

FOREIGN PATENT DOCUMENTS

| | | |
|---|---|---|
| JP | 2003-229164 | 8/2003 |
| JP | 2004-152539 | 5/2004 |
| JP | 2005-340075 | 12/2005 |
| JP | 2008-105924 | 5/2008 |
| JP | 2008-159467 | 7/2008 |
| JP | 2009-532322 | 9/2009 |
| JP | 2010-067534 | 3/2010 |
| JP | 2010-170900 | 8/2010 |
| WO | 2007/137068 | 11/2007 |

OTHER PUBLICATIONS

Japanese Office Action with partial English translation dated Aug. 26, 2014, 4 pages.
Japanese Office Action with partial English Translation dated May 26, 2015, 4 pages.
Japanese Office Action with partial English translation dated Jan. 5, 2016, 4 pages.
Japanese Office Action dated Aug. 16, 2016 with partial English translation.

* cited by examiner

FUEL CELL SYSTEM

TECHNICAL FIELD

The present invention relates to a fuel cell system including a fuel cell stack formed by stacking a plurality of fuel cells. Each of the fuel cells is formed by stacking an electrolyte electrode assembly between separators. The electrolyte electrode assembly includes an anode, a cathode, and an electrolyte interposed between the anode and the cathode.

BACKGROUND ART

Generally, a solid oxide fuel cell (hereinafter also referred to as an SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators. In use of this SOFC, generally, predetermined numbers of the electrolyte electrode assemblies and the separators are stacked together to form a fuel cell stack.

The SOFC generates electrical energy by power generation reaction of a fuel gas supplied to the anode and an oxygen-containing gas supplied to the cathode. The fuel gas and the oxygen-containing gas after consumption in the power generation reaction (hereinafter referred to as an exhaust gas or an off gas) are discharged from the SOFC. The exhaust gas contains unconsumed (unreacted) fuel gas and oxygen-containing gas, water components, and carbon monoxide which can be used as a fuel of SOFC. It is desired to utilize the exhaust gas efficiently.

In this regard, for example, in a fuel cell system disclosed in Japanese Laid-Open Patent Publication No. 2002-246047 (hereinafter referred to as Conventional Technique 1), an exhaust gas circulation channel and a circulation blower are provided for circulating some of the exhaust gas from the anodes or the cathodes of the fuel cell back to a reformer. A liquid fuel is supplied into a hot atmosphere of the circulated exhaust gas and then vaporized. According to the structure, improvement in the responsiveness to load fluctuations is achieved.

Further, in a solid oxide fuel cell system disclosed in Japanese Laid-Open Patent Publication No. 2004-152539 (hereinafter referred to as Conventional Technique 2), a fuel exhaust gas from a solid oxide fuel cell is recycled to be mix with a raw fuel for reforming.

More specifically, as shown in FIG. 7, a bifurcated pipe 2 having one inlet and two outlets is provided in a channel downstream of the fuel electrode of a solid oxide fuel cell 1. By measuring pressure at the inlet and the two outlets of the bifurcated pipe 2, information regarding the recycle flow rate of the hot fuel exhaust gas is obtained. Further, a flow rate control valve 3, an air blower or a compressor is provided in a fuel gas channel. Based on the information regarding the flow rate, by controlling the flow rate control valve 3 or the air blower or the compressor, the fuel recycle flow rate is controlled.

SUMMARY OF INVENTION

In Conventional Technique 1, coking of the liquid fuel is prevented in correspondence with load fluctuations, and the exhaust gas is supplied into the carburetor by injection. In Conventional Technique 2, though the exhaust gas is recycled to be mixed with the raw fuel, operation of the reformer after mixing is not disclosed at all.

Normally, in the SOFC, when the city gas is used as a raw fuel, steam reforming is performed. Steam reforming is endothermic reaction, and can obtain higher heat energy from the raw fuel. Therefore, high heat efficiency is achieved. In contrast, in steam reforming, auxiliary devices such as a pump for supplying water, and an evaporator for evaporating water are required.

In contrast, partial oxidation reforming is exothermic reaction. Though heat energy obtained by the supplied a raw fuel is smaller, since no water is used, components such as the pump and the evaporator are not required, and thus, structure is simplified.

As described above, though steam reforming is suitable for stable continuous operation, it is not suitable for rapidly raising the temperature. In contrast, in the case of partial oxidation reforming, the time required for raising the temperature can be reduced. Both of the reforming methods have their advantages and disadvantages.

An object of the present invention is to provide a fuel cell system which is capable of suitably utilizing these differences between the reforming reactions, and recycling the exhaust gas after consumption in power generation reaction thereby to achieve efficient reforming.

The present invention relates to a fuel cell system including a fuel cell stack, an oxygen-containing gas flow rate control device, a reformer, a raw fuel flow rate control device, and an exhaust gas flow rate control device. The fuel cell stack is formed by stacking a plurality of fuel cells. Each of the fuel cells is formed by stacking an electrolyte electrode assembly between separators. The electrolyte electrode assembly includes an anode, a cathode, and an electrolyte interposed between the anode and the cathode. The oxygen-containing gas flow rate control device controls a supply amount of an oxygen-containing gas supplied to the cathode. The reformer reforms a raw fuel to produce a fuel gas supplied to the anode. The raw fuel flow rate control device controls a supply amount of the raw fuel supplied to the reformer. The exhaust gas flow rate control device allows some of an exhaust gas produced in power generation reaction of the fuel cell stack to flow into the reformer, and controls a supply amount of the exhaust gas.

In this fuel cell system, the oxygen-containing gas flow rate control device includes a power generation oxygen-containing gas flow rate controller for supplying the oxygen-containing gas to the fuel cell, and a start-up oxygen-containing gas flow rate controller for supplying the oxygen-containing gas to the reformer to perform partial oxidation reforming from the time of start-up of the fuel cell until the temperature of the fuel cell stack is raised to a predetermined temperature.

After the temperature of the fuel cell stack reaches the predetermined temperature, the exhaust gas flow rate control device supplies the exhaust gas to the reformer to perform the partial oxidation reforming and steam reforming.

In the present invention, the start-up oxygen-containing gas flow rate control device directly supplies the oxygen-containing gas to the reformer to perform partial oxidation reforming from start-up of the fuel cell until the temperature of the fuel cell stack is raised to a predetermined temperature. Therefore, at the beginning of start-up operation of the fuel cell stack, heat energy produced by partial oxidation reforming can be utilized as heat energy for raising the temperature of the fuel cell stack. Thus, the temperature of the fuel cell stack is raised rapidly.

Then, after the temperature of the fuel cell stack reaches a predetermined temperature where the fuel gas ignites spontaneously in the fuel cell stack, some of the exhaust gas produced in power generation of the fuel cell is supplied to the reformer. Therefore, steam reforming is performed using water vapor contained in the exhaust gas, and partial oxidation reforming is performed using the unconsumed oxygen-containing gas contained in the exhaust gas. Thus, in comparison with the case where only partial oxidation reforming is performed, improvement in the heat efficiency is achieved suitably.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
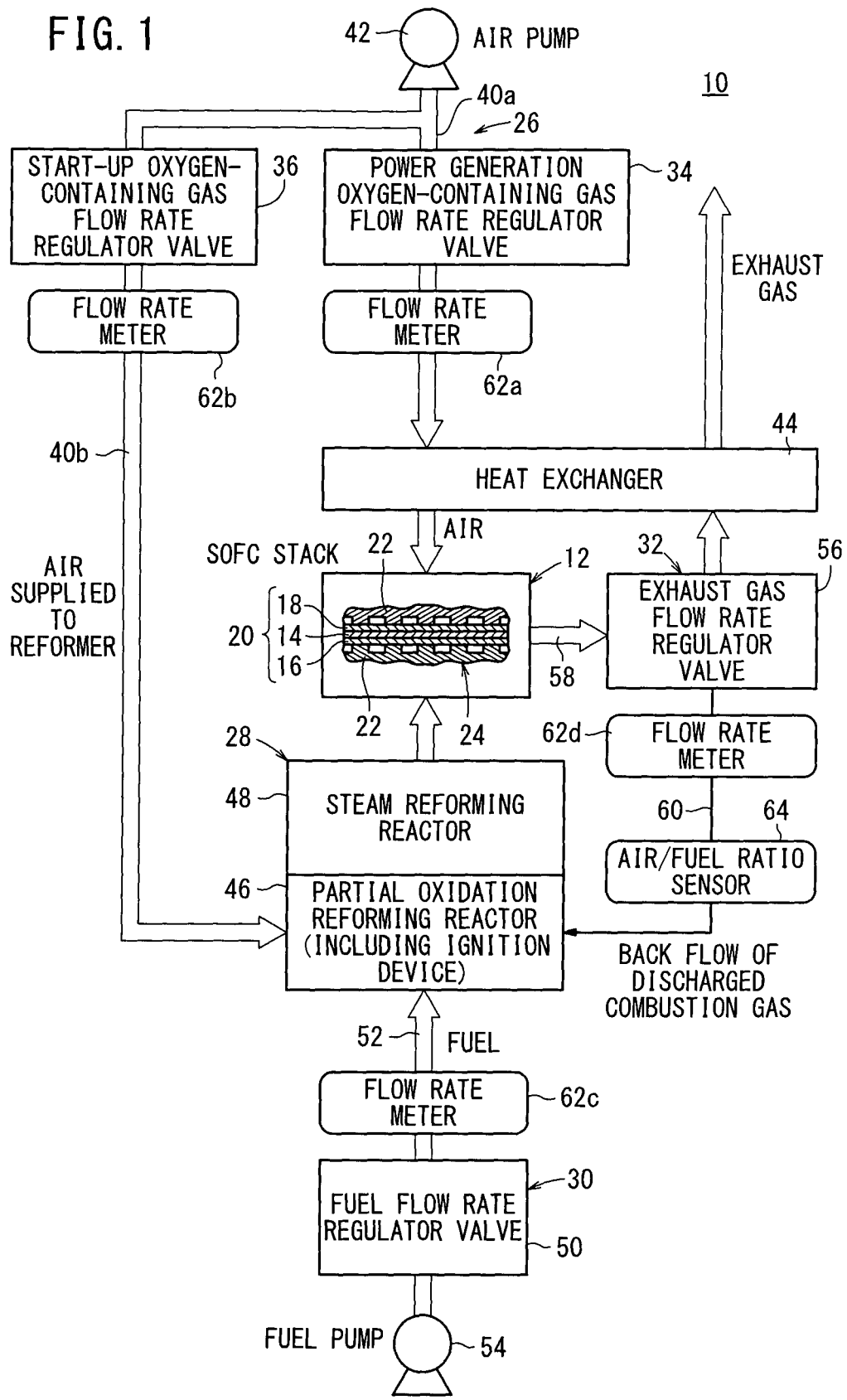
FIG. 1 is a diagram schematically showing a structure of a fuel cell system according to an embodiment of the present invention.

A fuel cell system 10 according to an embodiment of the present invention shown in FIG. 1 is used in various applications, including stationary and mobile applications. For example, the fuel cell system 10 is mounted in a vehicle.

The fuel cell system 10 includes a fuel cell stack 12. The fuel cell stack 12 includes a plurality of solid oxide fuel cells (SOFC) 24 stacked in a vertical direction or in a horizontal direction. Each of the fuel cells 24 includes an electrolyte electrode assembly 20 and a pair of separators 22 sandwiching the electrolyte electrode assembly 20. The electrolyte electrode assembly 20 includes an anode 16, a cathode 18, and a solid electrolyte (solid oxide) 14 made of ion-conductive solid oxide such as stabilized zirconia interposed between the anode 16 and the cathode 18.

The fuel cell 24 is a so called seal-less type fuel cell where a fuel gas (mixed gas of hydrogen gas, methane, and carbon monoxide) is supplied to the center of the anode 16, an oxygen-containing gas (air) is supplied to the center of the cathode 18, and exhaust gas is discharged from the outer circumference of the electrolyte electrode assembly 20.

The fuel cell system 10 includes an oxygen-containing gas flow rate control device 26 for controlling the supply amount of oxygen-containing gas supplied to the cathode 18, and a reformer 28 for reforming a raw fuel (e.g., city gas 13A) to produce the fuel gas to be supplied to the anode 16, a raw fuel flow rate control device 30 for controlling the supply amount of the raw fuel supplied to the reformer 28, and an exhaust gas flow rate control device 32 for allowing some of the exhaust gas produced in power generation reaction of the fuel cell stack 12 to flow into the reformer 28 and controlling the supply amount of the exhaust gas.

The oxygen-containing gas flow rate control device 26 includes a flow rate regulator valve (flow rate controller) 34 for regulating the flow rate of the oxygen-containing gas and supplying the oxygen-containing gas to the fuel cell stack 12 from operation at a predetermined temperature as described later to and at operation at a rated temperature (rated operating temperature) (hereinafter referred to as the power generation oxygen-containing gas flow rate regulator valve), and a flow rate regulator valve (flow rate controller) 36 for regulating the flow rate of the oxygen-containing gas and supplying the oxygen-containing gas to the reformer 28 thereby to perform partial oxidation reforming from start-up operation of the fuel cell stack 12 until the temperature of the fuel cell stack 12 is raised to a predetermined temperature (hereinafter referred to as the start-up oxygen-containing gas flow rate regulator valve).

The power generation oxygen-containing gas flow rate regulator valve 34 is provided in a power generation oxygen-containing gas supply channel 40a, and the start-up oxygen-containing gas flow rate regulator valve 36 is provided in a reforming oxygen-containing gas supply channel 40b.

The power generation oxygen-containing gas supply channel 40a and the reforming oxygen-containing gas supply channel 40b are merged at one end thereof, and connected to an air pump 42. The other end of the power generation oxygen-containing gas supply channel 40a is connected to the cathodes 18 of the fuel cell stack 12 through a heat exchanger 44. The other end of the reforming oxygen-containing gas supply channel 40b is connected to a partial oxidation reforming reactor 46 of a reformer 28. In the reformer 28, the partial oxidation reforming reactor 46 and the steam reforming reactor 48 are arranged along the flow direction of the fuel, and an ignition device (not shown) is provided in the partial oxidation reforming reactor 46.

The raw fuel flow rate control device 30 includes a fuel flow rate regulator valve 50, and the fuel flow rate regulator valve 50 is provided in the raw fuel supply channel 52. A fuel pump 54 is provided on the upstream side of the raw fuel supply channel 52, and the partial oxidation reforming reactor 46 is connected to the downstream side of the raw fuel supply channel 52.

The exhaust gas flow rate control device 32 includes an exhaust gas flow rate regulator valve 56, and the exhaust gas flow rate regulator valve 56 is provided in the exhaust gas pipe 58 of the fuel cell stack 12. The exhaust gas pipe 58 is provided at the heat exchanger 44. One end of an exhaust gas return pipe 60 is connected to the exhaust gas flow rate regulator valve 56, and the other end of the exhaust gas return pipe 60 is connected to the partial oxidation reforming reactor 46 of the reformer 28.

A flow rate meter 62a is provided in the power generation oxygen-containing gas supply channel 40a, at a position downstream of the power generation oxygen-containing gas flow rate regulator valve 34. A flow rate meter 62b is provided in the reforming oxygen-containing gas supply channel 40b, at a position adjacent to the outlet of the start-up oxygen-containing gas flow rate regulator valve 36.

A flow rate meter 62c is provided in the raw fuel supply channel 52, at a position adjacent to the outlet of the fuel flow rate regulator valve 50. A flow rate meter 62d is provided in the exhaust gas return pipe 60, at a position adjacent to the outlet of the exhaust gas flow rate regulator valve 56, and an air/fuel ratio sensor 64 is provided downstream of the flow rate meter 62d.

Figure 2:
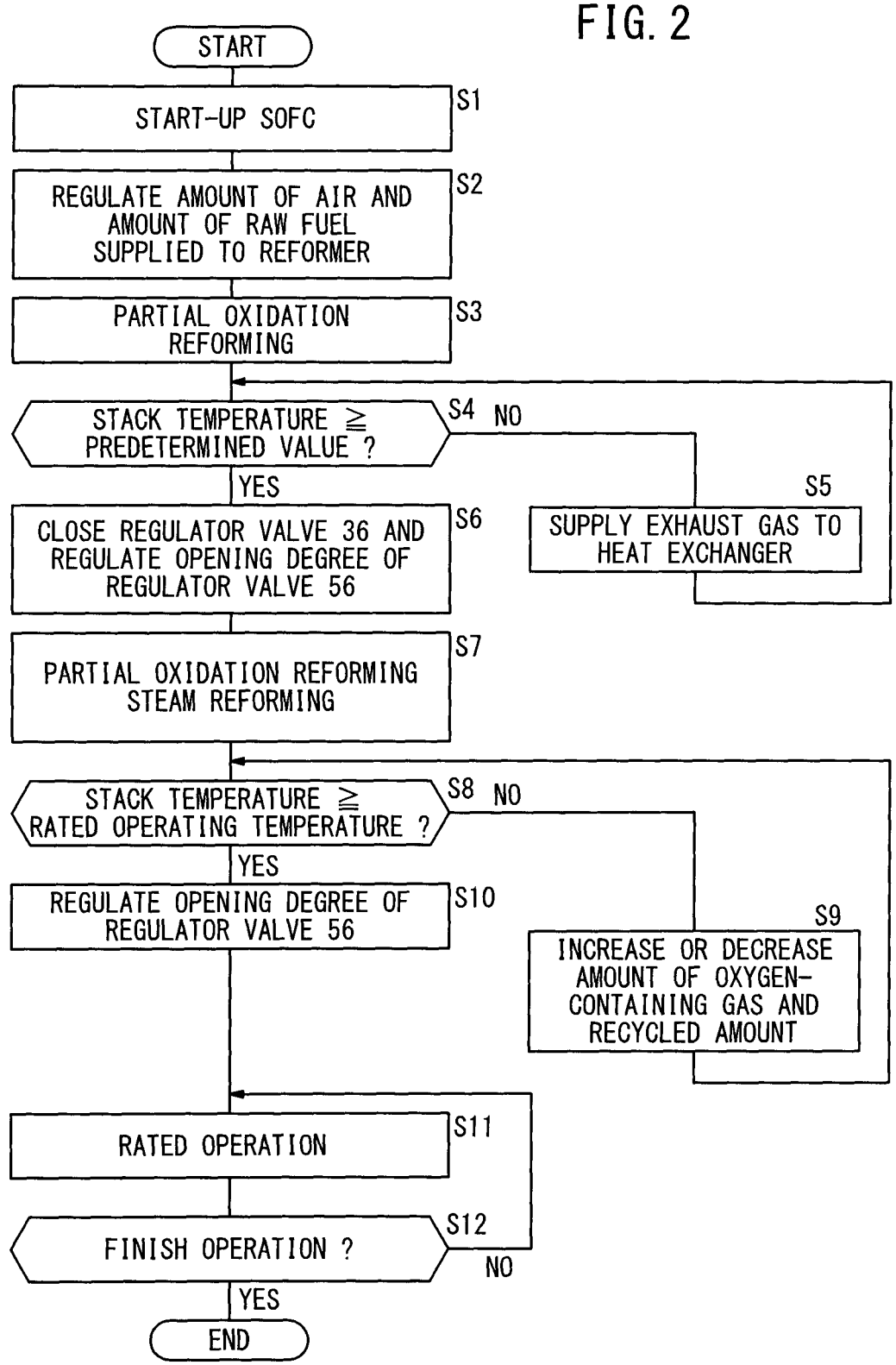
FIG. 2 is a flow chart showing an operational sequence of the fuel cell system.

Operation of the fuel cell system 10 will be described with reference to a flow chart shown in FIG. 2.

When operation of the fuel cell stack 12 of the fuel cell system 10 is started (step S1), the process proceeds to step S2 for operating the oxygen-containing gas flow rate control device 26 and the raw fuel flow rate control device 30.

The oxygen-containing gas flow rate control device 26 regulates the opening degree of the power generation oxygen-containing gas flow rate regulator valve 34, and regulates the opening degree of the start-up oxygen-containing gas flow rate regulator valve 36. The raw fuel flow rate control device 30 regulates the opening degree of the fuel flow rate regulator valve 50. In step S2, the volume ratio between the oxygen-containing gas supplied to the reformer 28 by the start-up oxygen-containing gas flow rate regulator valve 36 and the raw fuel supplied to the reformer 28 by the fuel flow rate regulator valve 50 is regulated to be within the range between the stoichiometric air/fuel ratio×0.9 and the stoichiometric air/fuel ratio.

Figure 3:
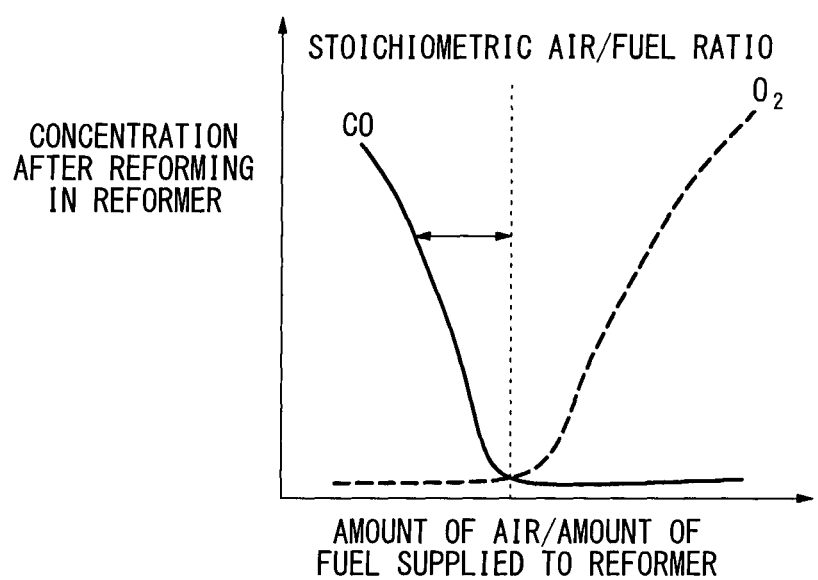
FIG. 3 is a graph showing the stoichiometric air/fuel ratio between the amount of air and the amount of fuel in a reformer.

The stoichiometric air/fuel ratio has the relationship as shown in FIG. 3, and perfect combustion occurs in the partial oxidation reforming reactor 46 of the reformer 28.

Thus, carbon monoxide or the oxygen-containing gas that has not been consumed in combustion does not remain in the fuel gas which is supplied to the anode 16 of the fuel cell stack 12, and oxidation of the anode 16 can be prevented. Therefore, in the partial oxidation reforming reactor 46, a desired partial oxidation reaction is obtained, and the fuel gas heated to a relatively high temperature due to the exothermic reaction is supplied to the anode 16 of the fuel cell stack 12.

If the volume ratio is smaller than the stoichiometric air/fuel ratio×0.9, heat energy generated in partial oxidation reaction is decreased, and the energy efficiency during the temperature-rising period is lowered. Therefore, the rate of raising the temperature becomes slow. Further, if the volume ratio is larger than the stoichiometric air/fuel ratio, since the oxygen-containing gas remains in the exhaust gas after reforming, the anode 16 of the electrolyte electrode assembly 20 is oxidized, and the performance is degraded.

The stoichiometric air/fuel ratio can be determined depending on the type of raw fuel. For example, in the cases of hydrogen, methane, propane, and city gas, the stoichiometric air/fuel ratios are 2.58, 9.52, 23.8, and 9 to 14, respectively, in terms of the volume ratio. Further, in the cases of methanol, ethanol, liquefied petroleum gas (LPG), gasoline, light oil, the stoichiometric air/fuel ratios are 6.45, 9.0, 15 to 16, 14 to 16, and 14 to 16, respectively, in terms of the weight ratio. The stoichiometric air/fuel ratios of the city gas, liquefied petroleum gas, gasoline, and light oil change depending on the constituent components. In the oxygen-containing gas flow rate control device 26, by operation of the air pump 42, air is supplied to the fuel cell stack 12 from the power generation oxygen-containing gas flow rate regulator valve 34 through the heat exchanger 44, and the air is supplied to the fuel cell stack 12. When the air flows through the heat exchanger 44, heat exchange occurs between water components in the air and the exhaust gas discharged from the fuel cell stack 12, and the oxygen-containing gas (air) at relatively high temperature is supplied to the cathode 18 of the fuel cell stack 12.

If the stack temperature is less than a predetermined value (NO in step S4), the process proceeds to step S5 for supplying all the exhaust gas to the heat exchanger 44 by opening the exhaust gas flow rate regulator valve 56 of the exhaust gas flow rate control device 32. Thus, the air supplied to the fuel cell stack 12 is further heated.

If it is determined that the stack temperature is the predetermined value or more (YES in step S4), the process proceeds to step S6. The predetermined value herein means a temperature at which the fuel gas can ignite spontaneously in the fuel cell stack 12.

In step S6, the start-up oxygen-containing gas flow rate regulator valve 36 is closed to prevent the oxygen-containing gas from being directly supplied to the reformer 28. Further, the opening degree of the exhaust gas flow rate regulator valve 56 is regulated. Thus, the exhaust gas discharged from the fuel cell stack 12 is supplied to the heat exchanger 44 and the exhaust gas return pipe 60 at their respective predetermined amounts.

Figure 4:
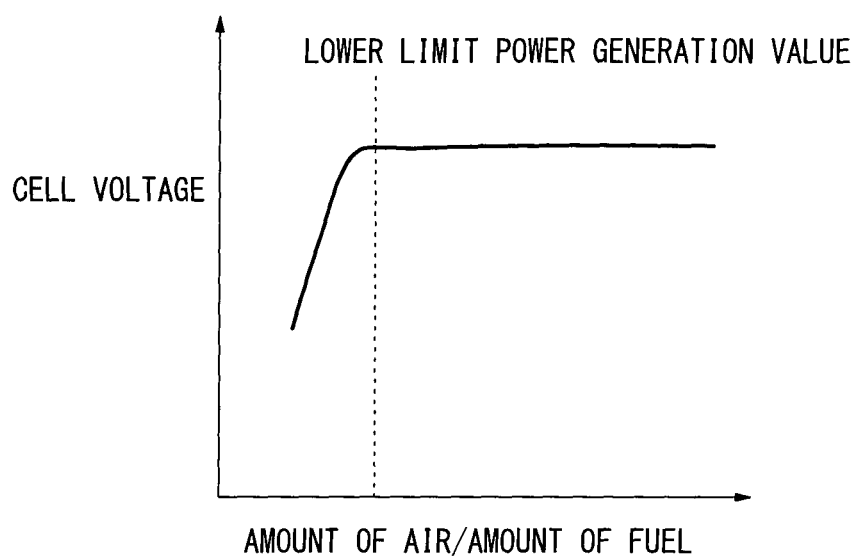
FIG. 4 is a graph showing a relationship between the amount of air and the amount of fuel in the fuel cell stack and the cell voltage.

In the case of the city gas 13A, the A/F (air amount/fuel amount) of the fuel cell stack 12 has a lower limit power generation value of 8. As shown in FIG. 4, the lower limit power generation value is a lower limit value of the power generation performance of the fuel cell stack 12.

Figure 5:
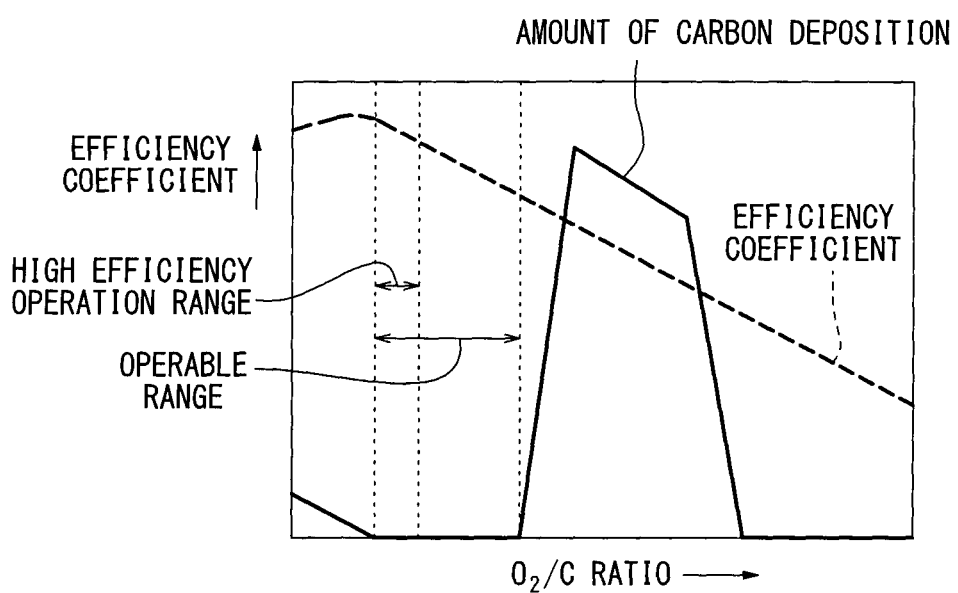
FIG. 5 is a map based on the air/fuel ratio in partial oxidation reforming.

Further, as shown in FIG. 5, a map of the air/fuel ratio in partial oxidation reforming, e.g., $O_2/C$ (corresponding to the molar ratio of oxygen and carbon) is created. The air/fuel ratio is determined so as to enable power generation operation within an operable range of $O_2/C$, and to achieve operation in the high efficiency operation range for higher efficiency. Then, in order to maintain the $O_2/C$ in the exhaust gas in the above range, physical properties of the exhaust gas are measured by the flow rate meter 62d and the air/fuel ratio sensor 64 thereby to determine the opening degree of the exhaust gas flow rate regulator valve 56. In FIG. 5, the operable range of $O_2/C$ is 0.55 to 0.80, and the most efficient operation range of $O_2/C$ is 0.55 to 0.65.

Figure 6:
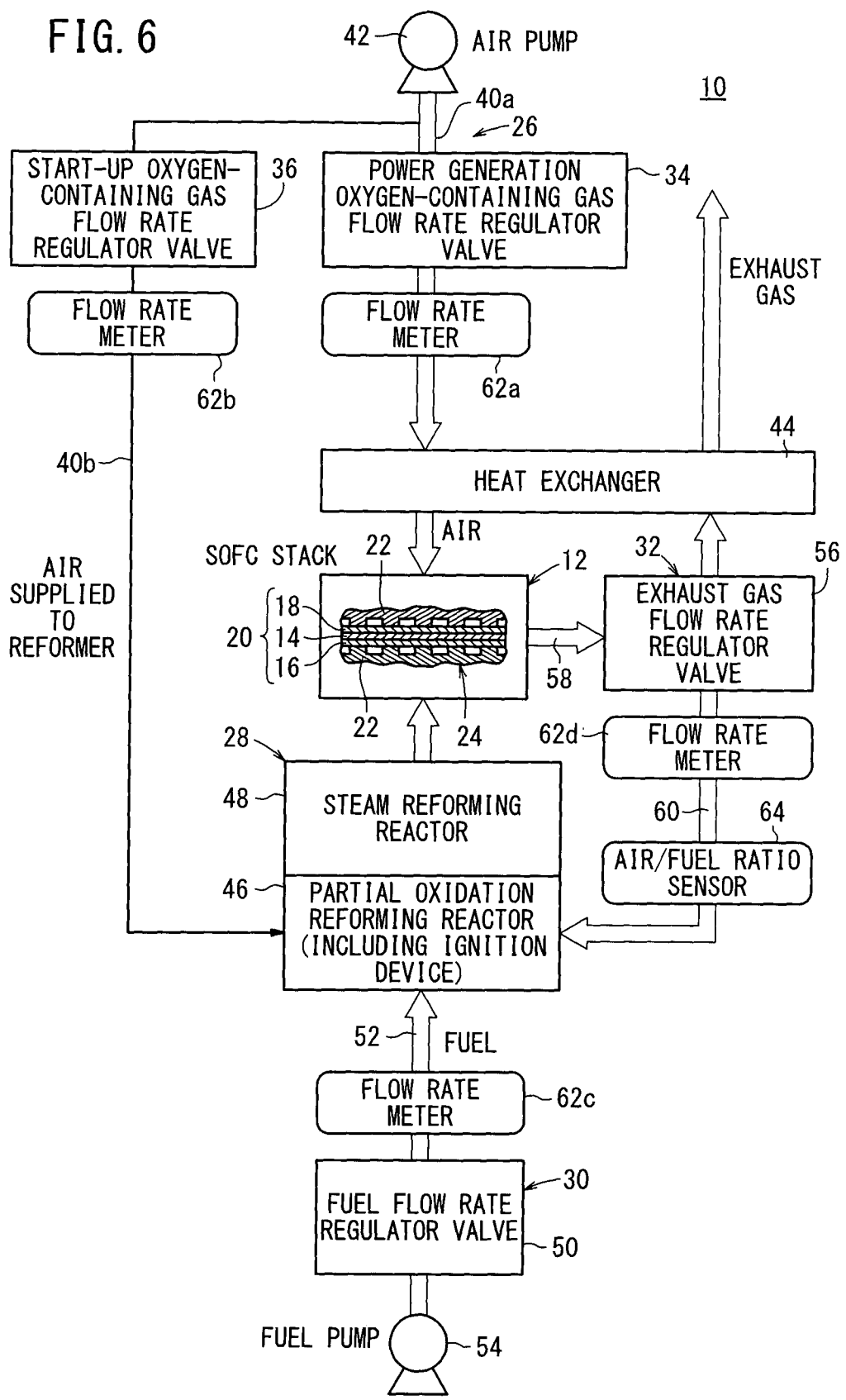
FIG. 6 is a diagram showing a state during power generation of the fuel cell system.
Figure 7:
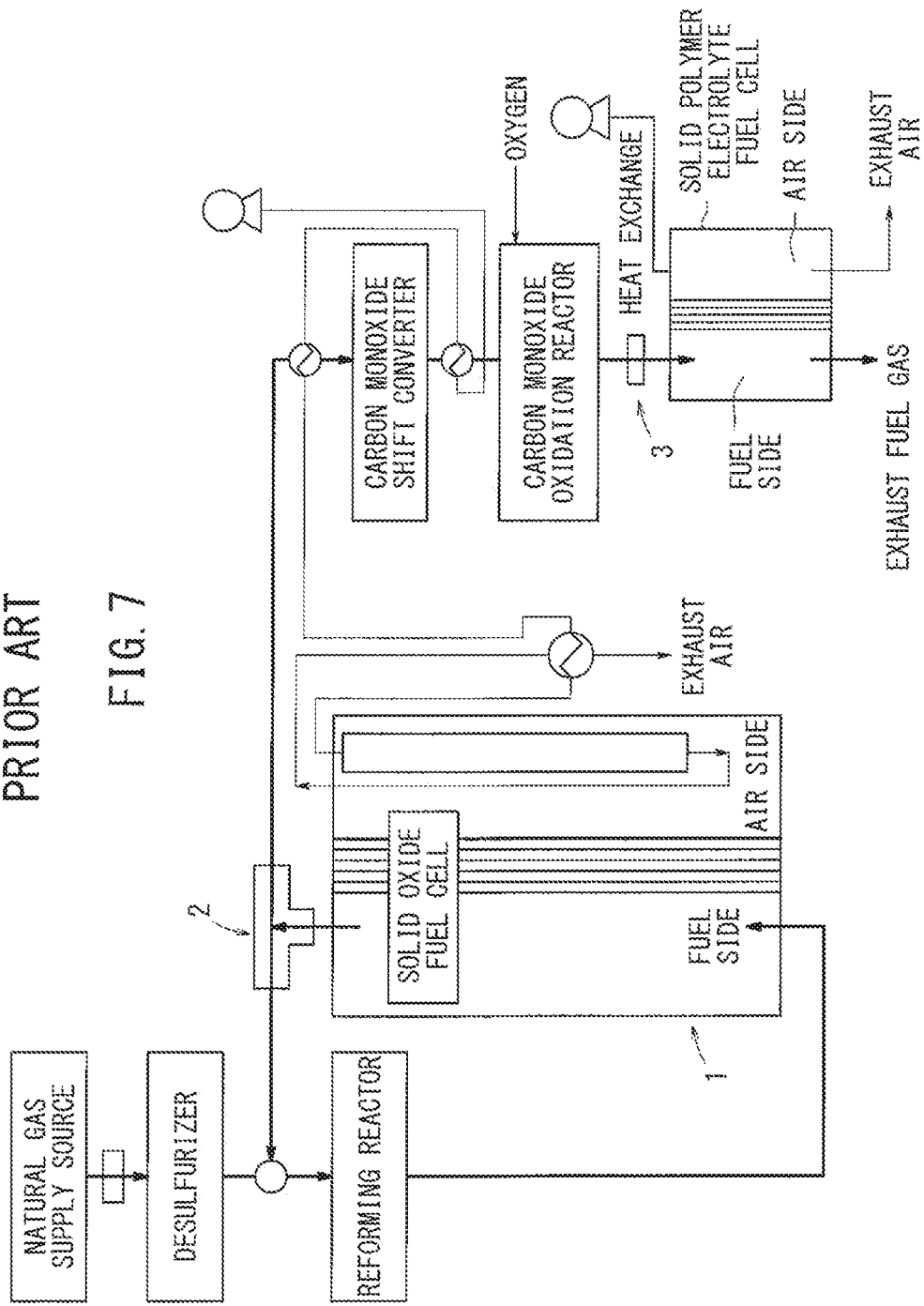
FIG. 7 is a diagram showing a solid oxide fuel cell system in Conventional Technique 2.

Thus, in the reformer 28, partial oxidation reforming by the partial oxidation reforming reactor 46 using excessive oxygen after combustion in the fuel cell stack 12, and steam reforming by the steam reforming reactor 48 using hydrogen in the combustion gas in the fuel cell stack 12 are performed (step S7). This state is shown in FIG. 6. Control is implemented to allow the fuel cell stack 12 to perform power generation at the volume air/fuel ratio of 8 or more, and at the stack temperature within the range of 600 to 750° C. The air/fuel ratio (air supplied to the stack/fuel supplied to the stack) during power generation is larger than the stoichiometric air/fuel ratio.

If the stack temperature has not yet reached the rated temperature (NO in step S8), the process proceeds to step S9 for adjusting (increasing/decreasing) the amount of the oxygen-containing gas supplied to the fuel cell stack 12, and the amount of the recycled gas supplied into the reformer 28.

If it is determined that the stack temperature is the rated temperature or more (YES in step S8), the process proceeds to step S10 for regulating the opening degree of the exhaust gas flow rate regulator valve 56. During transition from the predetermined temperature to the rated temperature, the volume ratio of the oxygen-containing gas supplied to the reformer 28 and the raw fuel supplied to the reformer 28 is regulated to be within the range between the stoichiometric air/fuel ratio×0.9 and the stoichiometric air/fuel ratio, and the supply amount of the exhaust gas supplied into the reformer 28 is regulated to be within the range of 15 to 40% of the entire exhaust gas amount.

Thus, the process proceeds to rated operation (step S11). During the rated operation, the molar ratio between the oxygen-containing gas in the exhaust gas and the carbon components in the raw fuel supplied to the reformer 28 is regulated to be preferably within the range of 0.55 to 0.80, and more preferably, within the range of 0.55 to 0.65, and the supply amount of the exhaust gas supplied into the reformer 28 is regulated to 25% of the entire exhaust gas amount. Then, the rated operation continues until an instruction to stop the operation is issued (YES in step S12).

If the molar ratio is smaller than 0.55, carbon deposition (i.e., coking) tends to occur easily in the fuel cell stack 12 or the electrolyte electrode assembly 20, and the catalyst performance at the electrode is degraded. If the molar ratio is larger than 0.80, then coking occurs, and moreover, the operation efficiency is lowered. Operation can be performed when the molar ratio is within the range of 0.55 to 0.80, and can be performed most efficiently when the molar ratio is within the range of 0.55 to 0.65.

In the embodiment of the present invention, the start-up oxygen-containing gas flow rate regulator valve 36 is opened from the time of start-up of the fuel cell 24 until the temperature of the fuel cell stack 12 is raised to a predetermined temperature. The oxygen-containing gas (air) is supplied directly to the reformer 28 to perform partial oxidation reforming. Therefore, at the beginning of start-up operation of the fuel cell stack 12, heat energy produced by partial oxidation reforming can be utilized as heat energy for raising the temperature of the fuel cell stack 12. Thus, the temperature of the fuel cell stack 12 is raised rapidly.

Then, after the temperature of the fuel cell stack 12 reaches a predetermined temperature where the fuel gas ignites spontaneously in the fuel cell stack 12, some of the exhaust gas produced in power generation of the fuel cell 24 is supplied to the reformer 28. As a result, in the reformer 28, steam reforming is performed using water vapor contained in the exhaust gas in the steam reforming reactor 48, and partial oxidation reforming is performed using the unconsumed oxygen-containing gas contained in the exhaust gas in the partial oxidation reforming reactor 46. Thus, in comparison with the case where only partial oxidation reforming is performed, improvement in the heat efficiency is achieved suitably.

Further, in the fuel cell system 10, before reaching the predetermined temperature, the volume ratio between the oxygen-containing gas supplied to the reformer 28 by the start-up oxygen-containing gas flow rate regulator valve 36 and the raw fuel supplied to the reformer 28 by the raw fuel flow rate control device 30 is regulated to be within the range between the stoichiometric air/fuel ratio×0.9 and the stoichiometric air/fuel ratio. Thus, with respect to the fuel flow rate, the air corresponding to the stoichiometric air/fuel ratio is supplied to the partial oxidation catalyst in the reformer 28. In this manner, the fuel gas after reforming is perfectly combusted, and does not contain oxygen-containing gas such as oxygen, carbon monoxide, etc.

Further, in the fuel cell system 10, in the case of reaching the predetermined temperature, the molar ratio of the oxygen-containing gas supplied to the reformer 28 by the exhaust gas flow rate control device 32 and the carbon component in the raw fuel supplied to the reformer 28 by the raw fuel flow rate control device 30 is regulated to be within the range of 0.55 to 0.65, and the supply amount of the exhaust gas supplied into the reformer 28 by the exhaust gas flow rate control device 32 is regulated to be within the range of 15 to 40% of the entire exhaust gas amount. Thus, steam reforming and partial oxidation reforming are performed desirably.

Further, in the fell cell system 10, during operation from the predetermined temperature until the rated temperature, the volume ratio between the oxygen-containing gas supplied to the reformer 28 by the exhaust gas flow rate control device 32 and the raw fuel supplied to the reformer 28 by the raw fuel flow rate control device 30 is regulated to be within the range between the stoichiometric air/fuel ratio×0.9 and the stoichiometric air/fuel ratio. Further, the supply amount of the exhaust gas supplied into the reformer 28 by the exhaust gas flow rate control device 32 is regulated to be within the range of 15 to 40% of the entire exhaust gas amount. Therefore, partial oxidation reformer is performed suitably, and steam reforming is performed desirably.

Although certain preferred embodiments of the present invention have been shown and described in detail, it should be understood that various changes and modifications may be made therein without departing from the scope of the appended claims.

The invention claimed is:

1. A method of operating a fuel cell system,
wherein the fuel cell system comprises:
a fuel cell stack formed by stacking a plurality of fuel cells, the fuel cells each formed by stacking an electrolyte electrode assembly between separators, the electrolyte electrode assembly including an anode, a cathode, and an electrolyte interposed between the anode and the cathode;
an oxygen-containing gas flow rate control device configured to control a supply amount of an oxygen-containing gas supplied to the cathode;
a reformer for reforming a raw fuel to produce a fuel gas supplied to the anode;
a raw fuel flow rate control device configured to control a supply amount of the raw fuel supplied to the reformer;
a heat exchanger; and
an exhaust gas flow rate control device configured to direct a portion of a mixed exhaust gas comprising a fuel exhaust gas discharged from the anode and an oxygen-containing exhaust gas discharged from the cathode of the fuel cell stack, to flow into the reformer and the heat exchanger, and to control a supply amount of the mixed exhaust gas,
wherein the oxygen-containing gas flow rate control device comprises:
a power generation oxygen-containing gas flow rate controller configured to supply the oxygen-containing gas to the fuel cell stack; and
a start-up oxygen-containing gas flow rate controller configured to supply the oxygen-containing gas to the reformer to perform partial oxidation reforming from a time of start-up of the fuel cell stack until a temperature of the fuel cell stack is raised to a predetermined temperature, the predetermined temperature being a temperature at which the fuel gas ignites spontaneously in the fuel cell stack, and the predetermined temperature being less than a rated temperature at which the fuel cell system operates to perform power generation;
wherein, the reformer includes a partial oxidation reforming reactor and a steam reforming reactor;
wherein the exhaust gas flow rate control device includes:
an exhaust gas flow rate regulator valve provided between an exhaust gas return pipe and an exhaust gas pipe extending from the fuel cell stack to the heat exchanger, and
a flow rate meter and an air/fuel ratio sensor provided in the exhaust gas return pipe,
the exhaust gas flow rate regulator valve is configured to divide the mixed exhaust gas to direct a first divided portion of the mixed exhaust gas to flow into the reformer and to direct a second divided portion of the mixed exhaust gas to flow into the heat exchanger;

wherein the heat exchanger is configured to exchange heat between the second divided portion of the mixed exhaust gas and the oxygen-containing gas supplied to the cathode; and wherein the method comprises:

producing the fuel gas by performing the partial oxidation reforming of the raw fuel using the oxygen-containing gas directly supplied from the start-up oxygen-containing gas flow rate controller to the partial oxidation reforming reactor and the raw fuel supplied from the raw fuel flow rate control device to the partial oxidation reforming reactor, and raising the temperature of the fuel cell stack to the predetermined temperature by supplying the fuel gas and the oxygen-containing gas that is supplied from the power generation oxygen-containing gas flow rate controller via the heat exchanger while letting heat exchange occur between the oxygen-containing gas supplied from the power generation oxygen-containing gas flow rate controller and the second divided portion of the mixed exhaust gas discharged from the fuel cell stack and divided and directed to flow to the heat exchanger by the exhaust gas flow rate regulator valve, wherein before the temperature of the fuel cell stack reaches the predetermined temperature, the mixed exhaust gas is supplied only to the heat exchanger, among the heat exchanger and the reformer, and is not supplied to the reformer and steam reforming using the steam reforming reactor is not performed;

stopping, after the temperature of the fuel cell stack reaches the predetermined temperature, supplying the oxygen-containing gas from the start-up oxygen-containing gas flow rate controller to the partial oxidation reforming reactor, switching using the exhaust gas flow rate regulator valve from a state in which the mixed exhaust gas is supplied only to the heat exchanger among the reformer and the heat exchanger to a state in which the mixed exhaust gas is supplied to both the heat exchanger and the reformer, and performing steam reforming and the partial oxidation reforming of the raw fuel supplied from the raw fuel flow rate control device to the partial oxidation reforming reactor using, as a reactant in each of the steam reforming and the partial oxidation reforming, the first divided portion of the mixed exhaust gas discharged from the fuel cell stack, and divided and directed to flow to the reformer by the exhaust gas flow rate regulator valve while the second divided portion of the mixed exhaust gas is directed to flow to the heat exchanger;

after the fuel cell stack reaches the predetermined temperature, measuring physical properties of the exhaust gas with the flow rate meter and the air/fuel ratio sensor, and regulating an opening degree of the exhaust gas flow rate regulator valve such that a molar ratio between oxygen component of the oxygen-containing gas in the first divided portion of the mixed exhaust gas supplied to the reformer by the exhaust gas flow rate control device and carbon component in the raw fuel supplied to the reformer by the raw fuel flow rate control device is within a range of 0.55 to 0.80; and regulating the supply amount of the first divided portion of the mixed exhaust gas supplied into the reformer to be within a range between 15% to 40% of an entire mixed exhaust gas amount.

2. The method according to claim 1, wherein, before the temperature of the fuel cell stack reaches the predetermined temperature, the start-up oxygen-containing gas flow rate controller and the raw fuel flow rate control device regulate a volume ratio of the oxygen-containing gas supplied to the reformer by the start-up oxygen-containing gas flow rate controller and the raw fuel supplied to the reformer by the raw fuel flow rate control device to be within a range between a stoichiometric air/fuel ratio×0.9 and the stoichiometric air/fuel ratio.

3. The method according to claim 1, wherein, during operation from the predetermined temperature until the rated temperature, the exhaust gas flow rate control device and the raw fuel flow rate control device regulate a volume ratio between the oxygen-containing gas in the first divided portion of the mixed exhaust gas supplied to the reformer by the exhaust gas flow rate control device and the raw fuel supplied to the reformer by the raw fuel flow rate control device to be within a range between a stoichiometric air/fuel ratio×0.9 and the stoichiometric air/fuel ratio.

* * * * *